US011942279B2

United States Patent
Hong et al.

(10) Patent No.: US 11,942,279 B2
(45) Date of Patent: Mar. 26, 2024

(54) TANTALUM CAPACITOR (71) Applicant: SAMSUNG ELECTRO-MECHANICS CO., LTD., Suwon-si (KR)

(72) Inventors: Jin Ho Hong, Suwon-si (KR); Young Seuck Yoo, Suwon-si (KR); Hee Sung Choi, Suwon-si (KR); Young June Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/988,298

(22) Filed: Nov. 16, 2022

(65) Prior Publication Data
US 2023/0215663 A1 Jul. 6, 2023

(30) Foreign Application Priority Data

Dec. 30, 2021 (KR) .................. 10-2021-0192931

(51) Int. Cl.
H01G 9/025 (2006.01)
H01G 9/15 (2006.01)
H01G 9/04 (2006.01)
H01G 9/052 (2006.01)

(52) U.S. Cl.
CPC ............... *H01G 9/025* (2013.01); *H01G 9/15* (2013.01); *H01G 2009/05* (2013.01); *H01G 9/052* (2013.01)

(58) Field of Classification Search
None
See application file for complete search history.

(56) References Cited

U.S. PATENT DOCUMENTS 8,451,588 B2 * 5/2013 Biler .................... H01G 9/0036
29/25.03
2012/0229955 A1 9/2012 Biler
2019/0392995 A1* 12/2019 Navratil ................. H01G 9/012

FOREIGN PATENT DOCUMENTS

| JP | 09320901 A | * 12/1997 |
| KR | 10-2012-0104121 A | 9/2012 |
| KR | 10-2020-0127049 A | 11/2020 |
| WO | 2019/246400 A1 | 12/2019 |

* cited by examiner

Primary Examiner — Eric W Thomas
(74) Attorney, Agent, or Firm — MORGAN, LEWIS & BOCKIUS LLP (57) ABSTRACT A tantalum capacitor includes a tantalum body comprising a tantalum sintered body containing tantalum powder, a conductive polymer layer disposed on the tantalum sintered body and including a first filler as a non-conductive particle, and a tantalum wire. The first filler includes a core including at least one metal oxide among $BaTiO_3$, $Al_2O_3$, $SiO_2$ and $ZrO_2$, and a coating film disposed on a surface of the core.

24 Claims, 5 Drawing Sheets

TANTALUM CAPACITOR

CROSS-REFERENCE TO RELATED APPLICATION

This application claims the benefit under 35 USC 119(a) of Korean Patent Application No. 10-2021-0192931 filed on Dec. 30, 2021 in the Korean Intellectual Property Office, the entire disclosure of which is incorporated herein by reference for all purposes.

TECHNICAL FIELD

The present disclosure relates to a tantalum capacitor, and to a tantalum capacitor having improved reliability by reducing moisture absorption while significantly preventing an increase in equivalent series resistance.

BACKGROUND

Tantalum (Ta) is a metal widely used in electrical and electronic, mechanical, chemical, medical, space and defence industries due to a relatively high melting point thereof and excellent mechanical and physical properties such as ductility and corrosion resistance.

In detail, tantalum is widely used as an anode material for small capacitors due to the ability thereof to form the most stable anodization film among all metals.

Moreover, the use of tantalum material is rapidly increasing every year due to the rapid development of IT industries such as electronics and information communication.

A tantalum capacitor has a structure using the gap generated when sintering and solidifying tantalum powder. Tantalum oxide ($Ta_2O_5$) is formed on the surface of tantalum as an electrode metal by anodizing, and by using the formed tantalum oxide as a dielectric, a manganese dioxide layer ($MnO_2$) or a conductive polymer layer is formed thereon as a solid electrolyte.

In addition, due to the derivation of the cathode electrode, a silver (Ag) layer is formed as a carbon layer and a metal layer on the manganese dioxide ($MnO_2$) layer or the conductive polymer layer.

Tantalum capacitors are characterized by low Equivalent Series Resistance (ESR) and high ripple current ratings.

Therefore, tantalum capacitors may have better temperature dependence and a longer service life than aluminum electrolytic capacitors.

However, in the case of the conductive polymer layer, it may affect the reliability evaluation due to high moisture absorption properties thereof, and additional solutions are needed to improve the performance of the polymer itself. In more detail, by containing a non-conductive material in the conductive polymer layer, the path of current that causes Leakage Current (LC) may be effectively blocked.

On the other hand, as the content of a non-conductive material in the conductive polymer layer increases, an increase in equivalent series resistance (ESR) is problematic. To resolve this problem, a method of using particles comprising a core-shell structure formed of a non-conductive material and a conductive polymer as a composite material is proposed.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a tantalum capacitor having excellent reliability by lowering a moisture absorption rate while effectively suppressing an increase in equivalent series resistance.

An aspect of the present disclosure is to provide a tantalum capacitor having improved reliability in a high temperature or high humidity environment.

According to an aspect of the present disclosure, a tantalum capacitor includes a tantalum body comprising a tantalum sintered body containing tantalum powder, a conductive polymer layer disposed on the tantalum sintered body and including a first filler as a non-conductive particle, and a tantalum wire. The first filler includes a core including at least one metal oxide among $BaTiO_3$, $Al_2O_3$, $SiO_2$ and $ZrO_2$, and a coating film disposed on a surface of the core.

According to an aspect of the present disclosure, a tantalum capacitor includes a tantalum body comprising a tantalum sintered body containing tantalum powder, a conductive polymer layer disposed on the tantalum sintered body and including a first filler, and a tantalum wire. The first filler includes a core and a coating film formed on a surface of the core, and the coating film includes poly(3,4-ethylenedioxythiophene):poly(styrenesulfonate) (PEDOT: PSS).

According to an aspect of the present disclosure, a tantalum capacitor includes a tantalum body comprising a tantalum sintered body containing a tantalum particle, and a conductive polymer layer disposed on the tantalum sintered body and including a first filler having a core-shell structure including a core including a metal oxide.

BRIEF DESCRIPTION OF DRAWINGS

The above and other aspects, features, and advantages of the presently disclosed concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided and thus, this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the detailed shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Hereinafter, embodiments of the present disclosure will be described with reference to the accompanying drawings.

In the drawings, the X-direction may be defined as a first direction, an L direction or a length direction, the Y-direction may be defined as a second direction, a W direction or a width direction, and the Z-direction may be defined as a third direction, a T direction, or a thickness direction.

Figure 1:
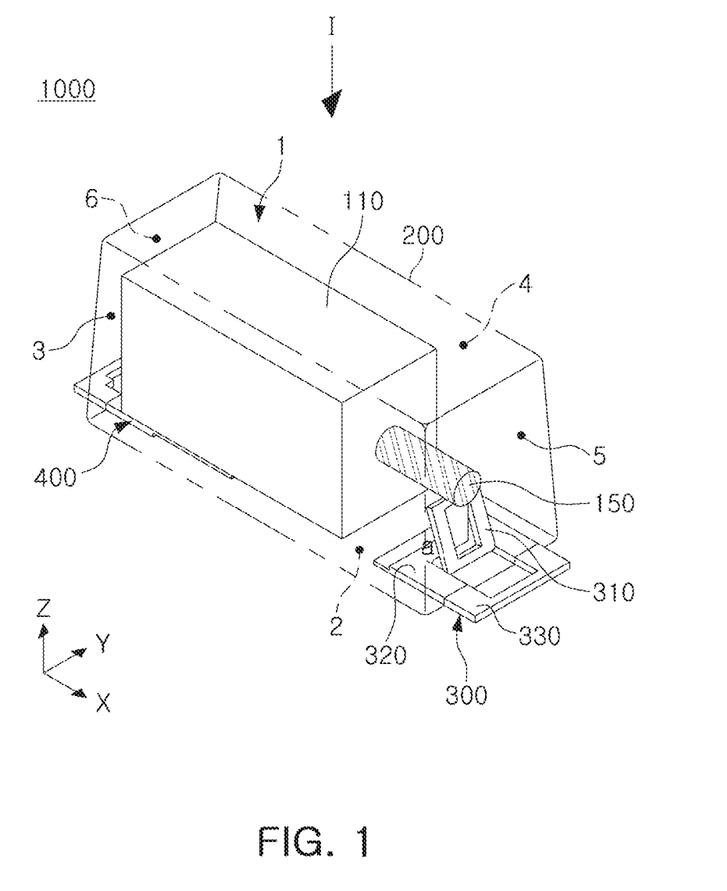
FIG. 1 is a perspective view of a tantalum capacitor according to an embodiment.

FIG. 1 is a perspective view of a tantalum capacitor according to an embodiment.

Referring to FIG. 1, a tantalum capacitor 1000 according to an embodiment may include a tantalum body 100 including tantalum powder (or particle) and having a tantalum wire 150 exposed to one end surface, a molded portion 200 having fifth and sixth surfaces 5 and 6 opposing each other in a first direction, third and fourth surfaces 3 and 4 opposing each other in a second direction, and first and second surfaces 1 and 2 opposing each other in a third direction, and formed to surround the tantalum body 100, an anode lead frame 300 exposed to (or extending from) the second surface 2 of the molded portion 200 and electrically connected to the tantalum wire 150, and a cathode lead frame 400 spaced apart from the anode lead frame 300 and exposed to (or extending from) the second surface 2 of the molded portion 200.

The tantalum body 100 may have the tantalum wire 150 exposed in the X-direction of the body. In this case, the tantalum wire 150 may penetrate through at least a portion of a tantalum sintered body 110 in the first direction (X). The tantalum wire 150 may be installed by being inserted into a mixture of the tantalum powder and a binder so as to be eccentric from the center before the powder in which the tantalum powder and the binder is mixed is compressed. For example, the tantalum body 100 may be manufacture by inserting and mounting the tantalum wire 150 in the tantalum powder mixed with a binder to form a tantalum element of a required size and then, by sintering the tantalum element in a high temperature and high vacuum ($10^{-5}$ torr or less) atmosphere for about 30 minutes.

The molded portion 200 covers the tantalum body 100, and may be formed in such a manner that one surface of a first connection portion 320 of the anode lead frame 300 and one surface of a second connection portion of the cathode lead frame 400 are exposed.

The molded portion 200 of the tantalum capacitor according to an embodiment may be formed by transfer molding a resin such as an epoxy molding compound (EMC) or the like to surround the tantalum body 100. The molded portion 200 serves to protect the tantalum wire 150 and the tantalum body 100 from the outside.

The anode lead frame 300 may be formed of a conductive metal such as nickel/iron alloy or the like, and may include the first connection portion 320, a first lead portion 330, and a first bend portion 310. The first bend portion 310 may be inclined toward the tantalum body 100 with respect to the first connection portion 320. The first connection portion 320 of the anode lead frame 300 may be exposed to the second surface 2 of the molded portion 200.

The first connection portion 320 may be exposed to the lower surface of the molded portion 200 to serve as a terminal at the time of being mounted on the board. In this case, the first connection portion 320 may be spaced apart from the tantalum body 100 and may function as a positive electrode of the tantalum capacitor 1000 according to an embodiment.

The cathode lead frame 400 may be formed of a conductive metal such as a nickel/iron alloy, and may include a second bend portion, a second connection portion, and a second lead portion formed of an integral body.

The second connection portion may be disposed parallel to and spaced apart from the first connection portion 320 of the anode lead frame 300 in the first direction (X). The second connection portion of the cathode lead frame 400 may be exposed to the second surface 2 of the molded portion 200. The second connection portion may be exposed to the lower surface of the molded portion 200 to serve as a terminal at the time of being mounted on the board. In this case, the second connection portion may be in contact with the tantalum body 100 and may function as a negative electrode of the tantalum capacitor 1000 according to an embodiment.

Figure 2:
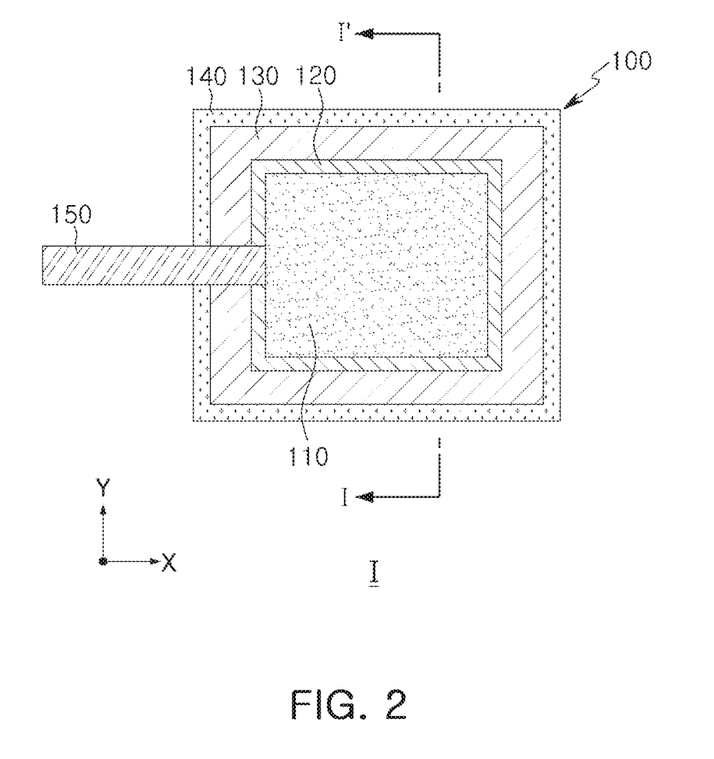
FIG. 2 is a cross-sectional view of a tantalum body in a tantalum capacitor according to an embodiment, as viewed from the I direction.

FIG. 2 is a cross-sectional view of a tantalum body in a tantalum capacitor according to an embodiment as viewed in the I direction.

Figure 3:
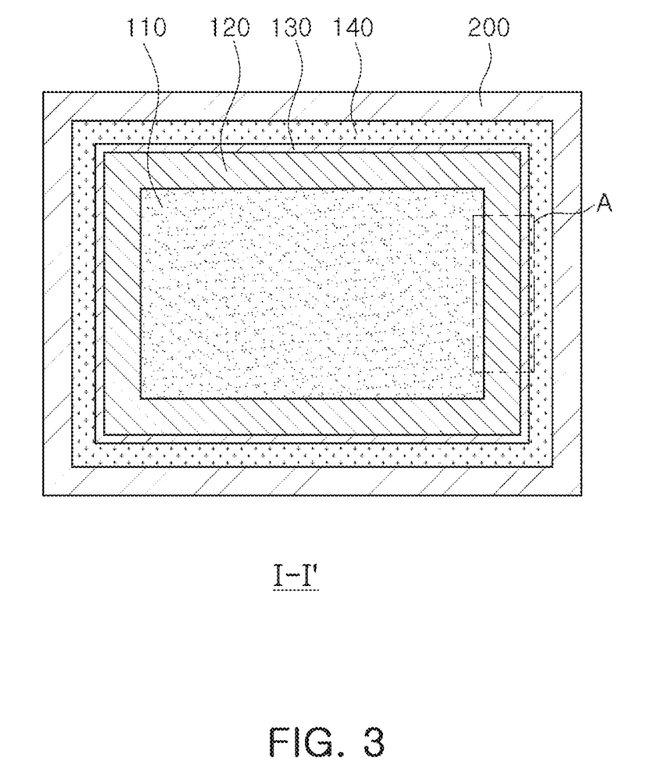
FIG. 3 is a cross-sectional view taken along line I-I' of FIG. 2.

FIG. 3 is a cross-sectional view taken along line I-I' of FIG. 2.

Referring to FIG. 2, the tantalum body 100 of the tantalum capacitor 1000 according to an embodiment may include the tantalum sintered body 110 formed by sintering a molded body containing metal powder, a conductive polymer layer 120 disposed on the tantalum sintered body 110, a carbon layer 130 disposed on the conductive polymer layer 120, and a silver (Ag) layer 140 disposed on the carbon layer 130.

The tantalum capacitor may further include the tantalum wire 150 having an insertion region positioned inside the tantalum sintered body 110 and a non-insertion region positioned outside the tantalum sintered body 110.

The tantalum sintered body 110 may be formed by sintering a molded body including a metal powder and a binder.

In detail, the tantalum sintered body 110 may be manufactured by mixing and stirring metal powder, a binder and a solvent in a certain ratio, compressing the mixed powder to form a rectangular parallelepiped, and sintering the same under high temperature and high vibration.

The metal powder is not particularly limited as long as it may be used for the tantalum sintered body 110 of the tantalum capacitor 1000 according to an embodiment, and may be a tantalum (Ta) powder. However, the present disclosure is not limited thereto, and for example, the metal powder may be at least one selected from the group consisting of aluminum (Al), niobium (Nb), vanadium (V), titanium (Ti) and zirconium (Zr). Accordingly, an aluminum sintered body, a niobium sintered body, or the like may be used instead of the tantalum sintered body.

The binder is not particularly limited, and may be, for example, a cellulose-based binder. The cellulose-based binder may be at least one selected from the group consisting of nitrocellulose, methyl cellulose, ethyl cellulose, and hydroxypropyl cellulose. In addition, the tantalum wire 150 may be inserted and mounted so as to be eccentric from the center before the mixed powder is compressed.

According to an embodiment, a dielectric oxide layer may be formed as an insulating layer on the tantalum sintered body 110. For example, the dielectric oxide layer may be formed by growing an oxide film ($Ta_2O_5$) on the surface of the tantalum sintered body 110 in a formation process using an electrochemical reaction. At this time, the dielectric oxide layer changes the tantalum sintered body 110 into a dielectric material. In addition, the conductive polymer layer 120 having a negative polarity may be applied on the dielectric oxide layer to be formed.

The conductive polymer layer 120 is not particularly limited, and may include, for example, a conductive polymer.

In detail, a conductive polymer is formed using a method of chemical polymerization or electrolytic polymerization using 3,4-ethylenedioxythiophene (EDOT), pyrrole monomer, or polypyrrole, and thereafter, may be formed as a negative electrode layer having a conductive polymer negative electrode on the outer surface of the tantalum sintered body 110 formed as an insulating layer.

For example, the conductive polymer layer 120 may be formed using a polymer slurry, and the polymer slurry may include at least one of polypyrrole, polyaniline, or EDOT (3,4-ethylenedioxythiophene). In addition, the conductive polymer layer 120 may include poly(3,4-ethylenedioxythiophene):poly(styrenesulfonate) (PEDOT:PSS). PEDOT:PSS may be prepared by oxidative polymerization of polystyrene sulfonate (PSS), using a charge-balancing template.

According to an example of the present disclosure, the conductive polymer layer 120 may include first and second fillers 121 and 122, and at least one of the first and second fillers 121 and 122 may have a core-shell structure, and accordingly, may include a coating film formed on the surface of the core. A detailed description of the conductive polymer layer 120 will be described later.

The carbon layer 130 is laminated on the conductive polymer layer 120, by dissolving the carbon powder in an organic solvent containing an epoxy resin, impregnating the tantalum sintered body 110 in a solution in which carbon powder has been dissolved, and then drying the same at a predetermined temperature to volatilize the organic solvent.

In addition, the carbon layer 130 may serve to prevent passage of silver (Ag) ions.

Next, the silver (Ag) layer 140 formed of a silver (Ag) paste may be formed on the upper surface of the carbon layer 130.

The silver (Ag) layer 140 may be laminated on the outside of the carbon layer 130 to improve conductivity.

In addition, the silver (Ag) layer 140 may facilitate electrical connection for polarity transfer by improving conductivity with respect to the polarity of the negative electrode layer.

Figure 4:
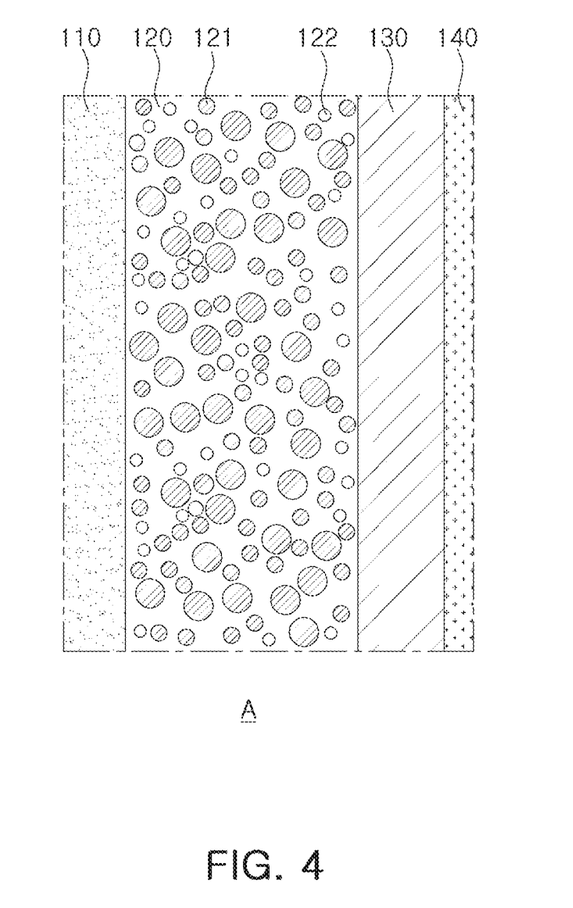
FIG. 4 is an enlarged view of area A of FIG. 3.

FIG. 4 is an enlarged view of area A of FIG. 3.

Figure 5:
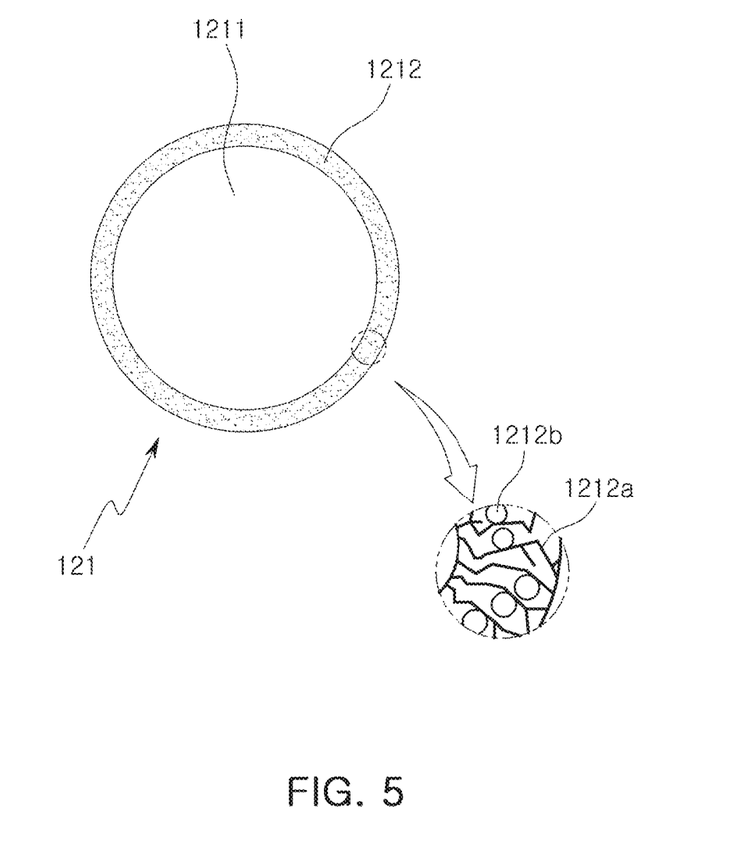
FIG. 5 is a cross-sectional view schematically illustrating a core-shell structure of a first filler of FIG. 4.

FIG. 5 is a cross-sectional view schematically illustrating a core-shell structure of the first filler of FIG. 4.

Referring to FIG. 4, in the case of the tantalum capacitor 1000 according to an example of the present disclosure, the above-described conductive polymer layer 120 may have a structure in which the first and second fillers 121 and 122 are distributed in a polymer slurry for formation of the conductive polymer layer 120.

The first filler 121 according to an embodiment of the present disclosure may include non-conductive particles. As an example, the first filler 121 may include silica ($SiO_2$), but is not limited thereto, and may include any one or more metal oxides among $BaTiO_3$, $Al_2O_3$, and $ZrO_2$. Tantalum capacitors of the related art have a problem in that the conductive polymer layer has relatively high moisture absorption properties and thus the reliability of the capacitor is low. In the case of embodiments of the present disclosure, by dispersing the first filler 121 including non-conductive particles such as silica in the conductive polymer layer 120, the moisture absorption rate of the conductive polymer layer 120 may be effectively lowered. In addition, as the conductive polymer layer 120 of the present disclosure includes the non-conductive first filler 121, the flow of current that causes leakage current may be prevented, and the properties of the entire capacitor 1000 may be improved by increasing the strength of the conductive polymer layer 120.

On the other hand, in a case in which a plurality of first fillers 121 are disposed in the conductive polymer layer 120 more than necessary, it may be advantageous in terms of a decrease in moisture absorption, but a problem in that the equivalent series resistance (ESR) is increased may occur. In the case of the tantalum capacitor 1000 according to an embodiment, since the conductive polymer is bonded to the surface of the first filler 121, an increase in ESR may be suppressed even when the content of non-conductive particles is increased.

Referring to FIG. 5, the structure of the first filler 121 according to the tantalum capacitor 1000 of the present disclosure is illustrated in detail.

The first filler 121 may include a core 1211 and a coating film 1212 (or a shell) surrounding the core 1211. Accordingly, the first filler 121 may have a core-shell structure. Referring to the enlarged view of FIG. 5, the coating film 1212 may include a conductive polymer such as polyheterocycle (e.g., polypyrrole, polythiophene, polyaniline, or the like), polyacetylene, poly-p-phenylene, and polyphenolate, and as a non-limiting example, the conductive polymer may be PEDOT:PSS. In some embodiments, the shell may include a conductive polymer.

The core 1211 may include the material of the first filler 121 described above. For example, the core 1211 may include silica ($SiO_2$), but is not limited thereto, and may include any one or more metal oxides among $BaTiO_3$, $Al_2O_3$, and $ZrO_2$.

In FIG. 5, the coating film 1212 may include a conductive polymer in which PSS 1212a and PEDOT 1212b are combined.

At this time, the PSS 1212a may be coupled to the surface of the core 1211 of the first filler using a coupling agent and a condensation reaction, and as a result, the core 1211 of the first filler may be covalently bonded to a functional group reacting with the inorganic material of the coupling agent, and the PSS 1212a may be bonded to a functional group reacting with the organic material of the coupling agent. In addition, the PEDOT 1212b may be ionically coupled to the PSS 1212a.

As an example, the core 1211 of the first filler 121 according to an embodiment of the present disclosure may be coupled to the coating film 1212 which is a polymer, using a coupling agent. In this case, the coupling agent may have two or more different reactive groups in the molecule, one of which may be a reactive group chemically bonding with an inorganic material, and the other of which may be a reactive group chemically bonding with an organic material. For example, the coupling agent may have an R—Si(OR')$_3$ structure, in which a functional group is denoted on the left side of Si and a hydrolyzable group on the right side of Si are denoted as OR'. The coupling agent may be hydrolyzed by treatment with water, a mixture of water and alcohol, or a variety of polar and non-polar solvents.

The core 1211 of the first filler 121 including silica may have a hydroxyl group (—OH) formed on the surface thereof through a treatment reaction with an aqueous alkali solution. The core 1211 and the coupling agent are mixed. In this case, the hydroxyl group (—OH) on the surface of the core 1211 and the hydroxyl group (—OH) of the coupling agent may be covalently bonded through a condensation reaction. By mixing with PEDOT:PSS aqueous dispersion and performing dehydration reaction thereof, the first filler having a core-shell structure in which the coating film 1212 including PEDOT(1212b):PSS(1212a) is formed on the surface of silica (core, 1211) may be manufactured. In this case, the hydroxyl group of the core 1211 and the hydroxyl group of the coupling agent are covalently bonded, and the PSS 1212a and the PEDOT 1212b may be ionically bonded.

The first filler 121 manufactured in this manner is dispersed in the conductive polymer layer 120 to improve withstand voltage characteristics, improve breakdown voltage (BDV) characteristics, and effectively prevent Leakage Current (LC).

In addition, due to the coating film 1212 chemically adsorbed on the surface of the core 1211, an increase in ESR in a high-temperature environment may be effectively suppressed while maintaining the ESR at a level of the related art.

As described above, since the coating film 1212 containing PEDOT:PSS is bonded to the surface of the core 1211 of the first filler 121, it is possible to suppress a significant increase in equivalent series resistance (ESR) due to an increase in the content of the non-conductive first filler 121. In addition, since the coating film 1212 includes PEDOT:PSS, the first filler 121 may be easily dispersed between the conductive polymer layers 120.

TABLE 1

| | Ratio of first filler in polymer layer (cross-sectional area ratio) | Moisture absorption (%) | ESR (mΩ) |
|---|---|---|---|
| 1 | 0.0 | 16.5 (NG) | 105 |
| 2 | 0.15 | 14.6 (NG) | 104 |
| 3 | 0.41 | 11.5 (NG) | 104 |
| 4 | 0.48 | 8.9 | 102 |
| 5 | 0.53 | 7.4 | 101 |
| 6 | 0.58 | 6.1 | 101 |
| 7 | 0.61 | 5.1 | 103 |
| 8 | 0.65 | 4.6 | 105 |
| 9 | 0.73 | 4.0 | 110 |
| 10 | 0.81 | 3.7 | 120 (NG) |

Table 1 is a table showing moisture absorption and equivalent series resistance (ESR) according to the ratio of the first filler 121 including silica ($SiO_2$) in the conductive polymer layer 120. In this case, the ratio of the first filler 121 is based on the ratio of the area occupied in the polymer layer 120 in one cross-section, and an example of measuring the ratio of the area of the first filler will be described. First, a tantalum capacitor sample is prepared, and a polishing process is performed from the negative electrode to the inside up to ⅓ to expose the cross section of the tantalum body. In this case, the polishing process may use laser polishing. In the cross section, the conductive polymer layer 120 is in the form of a band, and a total of 10 measurement points may be selected at equal intervals, and the SEM image is analyzed for a 5 μm×5 μm area of each measurement point. In this case, the conditions for acquiring the SEM image were a magnification of 15,000 times or more and an acceleration voltage of 10 kV. The images obtained in this manner were analyzed using an image analysis program, for example, paint, to analyze the area occupied by silica as the number of pixels.

In the experimental results of Table 1, when the moisture absorption was 10% or more, the ESR was determined to be unsuitable (NG) when it was 120 mΩ. As can be seen from the experimental results of Table 1, as the content of the first filler 121 including silica increases, it was confirmed that the moisture absorption may be lowered to an appropriate level when the cross-sectional area ratio exceeds 0.41 while the moisture absorption of the conductive polymer layer 120 tends to decrease. However, when the cross-sectional area ratio was increased to 0.81 level, ESR significantly increased to 120 mΩ level. As described above, the tantalum capacitor according to an embodiment has a structure in which the first filler 121 having a core-shell structure that may reduce moisture absorption and effectively suppress an increase in ESR is dispersed in the conductive polymer layer 120. Considering the moisture absorption and ESR characteristics, the preferred ratio of the first filler may be set to be more than 0.41 and less than 0.81 based on the cross-sectional area ratio.

On the other hand, before the first filler 121 is dispersed in the conductive polymer layer 120, the first filler 121 may already have a core-shell structure, and accordingly, the coating film 1212 including PEDOT:PSS on the surface may be formed. As a result, as the coating film 1212 of the first filler 121 and the conductive polymer layer 120 contain the same material, when the first filler 121 is dispersed in the conductive polymer layer 120, the bonding force therebetween may be secured, thereby preventing peeling defects and further facilitating dispersion.

In the tantalum capacitor 1000 of the present disclosure, the first filler 121 having a core-shell structure as described above, in detail, the first filler 121 including PEDOT:PSS, in which the coating film 1212 on the surface is a conductive polymer, is dispersed in the conductive polymer layer 120. Therefore, the effects of reducing moisture absorption, preventing an increase in ESR, and securing reliability may be all obtained. On the other hand, as will be described later, the conductive polymer layer 120 of the tantalum capacitor according to an embodiment may further include a second filler 122 including conductive particles.

On the other hand, referring to FIG. 4, the second filler 122 may be dispersed in the conductive polymer layer 120.

The conductive polymer layer 120 of the present disclosure may additionally include a second filler 122 including conductive particles of any one or more of graphene, carbon nanotubes, and black carbon. Since the conductive polymer layer 120 includes the second filler 122 formed of conductive particles, the thickness of the conductive polymer layer 120 on the central portion of the tantalum sintered body 110 may be easily adjusted.

In detail, in the process of forming the conductive polymer layer 120 on the tantalum sintered body 110, one or more conductive particles of graphene, carbon nanotubes, and black carbon may cause a coffee ring effect.

For example, the polymer slurry containing any one or more conductive particles among the graphene, carbon nanotubes, and black carbon starts to evaporate from the edge surface of the tantalum sintered body 110, and the density of particles at a first evaporated point increases, and due to this increased particle density and high solid content, the surrounding slurry and particles are further pulled, so that the thickness of the conductive polymer layer 120 disposed at the edge of the tantalum sintered body 110 may be increased, and thus, thickness control is relatively easy.

In addition, according to an embodiment, the conductive polymer layer 120 selectively selects particles having different conductivity among graphene, carbon nanotubes, and black carbon, and thus, the equivalent series resistance (ESR) of the tantalum capacitor may be adjusted to a required level.

On the other hand, in the case of the second filler 122, a coating film may also be formed on the surface as in the case of the first filler 121. As the coating film, a metal oxide may be used.

On the other hand, the average particle size of the first and second fillers 121 and 122 may be 100 nm or more and 1 μm or less, in detail, 40 nm or more and 5 μm or less, but is not limited thereto.

Other features are the same as those of the tantalum capacitor according to the embodiment described above, and thus a detailed description thereof will be omitted.

As set forth above, according to an embodiment of the present disclosure, a tantalum capacitor having excellent reliability may be provide by lowering a moisture absorption rate while effectively suppressing an increase in equivalent series resistance.

In addition, a tantalum capacitor having improved reliability in a high temperature or high humidity environment may be provided.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A tantalum capacitor comprising:
 a tantalum body comprising
  a tantalum sintered body containing tantalum particle,
  a conductive polymer layer disposed on the tantalum sintered body and including a first filler as a non-conductive particle, and
  a tantalum wire,
 wherein the first filler includes a core including at least one metal oxide among $BaTiO_3$, $Al_2O_3$, $SiO_2$ and $ZrO_2$, and a coating film disposed on a surface of the core.

2. The tantalum capacitor of claim 1, wherein the coating film comprises poly(3,4-ethylenedioxythiophene):poly(styrenesulfonate) (PEDOT:PSS).

3. The tantalum capacitor of claim 2, wherein the core of the first filler is $SiO_2$.

4. The tantalum capacitor of claim 2, wherein the coating film is coupled to the core by a coupling agent.

5. The tantalum capacitor of claim 4, wherein the coupling agent is covalently bonded to the surface of the core and is bonded to the PSS in the coating film.

6. The tantalum capacitor of claim 5, wherein the PEDOT in the coating film is ionically bonded to the PSS in the coating film.

7. The tantalum capacitor of claim 6, wherein the conductive polymer layer comprises poly(3,4-ethylenedioxythiophene):poly(styrenesulfonate) (PEDOT:PSS).

8. The tantalum capacitor of claim 7, wherein the conductive polymer layer further comprises a second filler as conductive particles.

9. The tantalum capacitor of claim 8, wherein the second filler comprises at least one of graphene, carbon nanotubes, and carbon black.

10. The tantalum capacitor of claim 9, wherein the second filler comprises a metal oxide coating film coated on a surface of the second filler.

11. The tantalum capacitor of claim 10, wherein the tantalum body further comprises:
a carbon layer disposed on the conductive polymer layer; and
a silver (Ag) layer disposed on the carbon layer, and
the tantalum wire penetrates through at least a portion of each of the tantalum sintered body, the conductive polymer layer, the carbon layer, and the silver (Ag) layer.

12. The tantalum capacitor of claim 11, wherein the tantalum capacitor includes,
a molded portion including a fifth surface and a sixth surface opposing in a first direction, a third surface and a fourth surface opposing in a second direction, and a first surface and a second surface opposing in a third direction, the molded portion surrounding the tantalum body,
an anode lead frame extending from the second surface of the molded portion and electrically connected to the tantalum wire; and
a cathode lead frame spaced apart from the anode lead frame and extending from the second surface of the molded portion.

13. A tantalum capacitor comprising:
a tantalum body comprising
a tantalum sintered body containing tantalum particle,
a conductive polymer layer disposed on the tantalum sintered body and including a first filler, and
a tantalum wire,
wherein the first filler includes a core and a coating film disposed on a surface of the core, and
the coating film includes poly(3,4-ethylenedioxythiophene):poly(styrenesulfonate) (PEDOT:PSS).

14. The tantalum capacitor of claim 13, wherein the core of the first filler comprises an oxide including at least one of Ba, Ti, Al, Si and Zr.

15. The tantalum capacitor of claim 13, wherein a cross-sectional area ratio of the first filler with respect to one cross-section of the conductive polymer layer is greater than 0.41 and less than 0.81.

16. A tantalum capacitor comprising:
a tantalum body comprising
a tantalum sintered body containing a tantalum particle, and
a conductive polymer layer disposed on the tantalum sintered body and including a first filler having a core-shell structure including a core including a metal oxide.

17. The tantalum capacitor of claim 16, wherein the metal oxide includes at least one of Ba, Ti, Al, Si and Zr.

18. The tantalum capacitor of claim 16, wherein the shell includes a first conductive polymer.

19. The tantalum capacitor of claim 18, wherein the first conductive polymer includes poly(3,4-ethylenedioxythiophene):poly(styrenesulfonate) (PEDOT:PSS).

20. The tantalum capacitor of claim 18, wherein the conductive polymer layer further includes a second conductive polymer.

21. The tantalum capacitor of claim 20, wherein the first and second conductive polymers include the same material.

22. The tantalum capacitor of claim 16, wherein a cross-sectional area ratio of the first filler with respect to one cross-section of the conductive polymer layer is greater than 0.41.

23. The tantalum capacitor of claim 16, wherein a cross-sectional area ratio of the first filler with respect to one cross-section of the conductive polymer layer is greater than 0.41 and less than 0.81.

24. The tantalum capacitor of claim 16, wherein the tantalum body further comprises a tantalum wire.

* * * * *